United States Patent
Wang et al.

(10) Patent No.: US 10,181,799 B2
(45) Date of Patent: Jan. 15, 2019

(54) HYBRID BACK-TO-BACK DIRECT CURRENT TRANSMISSION SYSTEM AND POWER FLOW REVERSAL CONTROL METHOD

(71) Applicants: NR ELECTRIC CO., LTD, Jiangsu (CN); NR ENGINEERING CO., LTD, Jiangsu (CN)

(72) Inventors: Nannan Wang, Jiangsu (CN); Wenqiang Zhao, Jiangsu (CN); Yongping Wang, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 15/735,204

(22) PCT Filed: Jan. 19, 2017

(86) PCT No.: PCT/CN2017/071655
§ 371 (c)(1),
(2) Date: Dec. 11, 2017

(87) PCT Pub. No.: WO2017/129026
PCT Pub. Date: Aug. 3, 2017

(65) Prior Publication Data
US 2018/0175739 A1    Jun. 21, 2018

(30) Foreign Application Priority Data
Jan. 28, 2016   (CN) .......................... 2016 1 0061214

(51) Int. Cl.
*H02M 5/45*   (2006.01)
*H02H 7/26*   (2006.01)
(Continued)

(52) U.S. Cl.
CPC ............ *H02M 5/4505* (2013.01); *H02H 7/26* (2013.01); *H02J 3/06* (2013.01); *H02J 3/36* (2013.01); *H02M 5/4585* (2013.01); *Y02E 60/60* (2013.01)

(58) Field of Classification Search
CPC .............................. H02M 5/44; Y02E 60/60
See application file for complete search history.

(56) References Cited

U.S. PATENT DOCUMENTS 5,870,293 A * 2/1999 Svensson .................. H02J 3/36
363/35
9,099,936 B2 * 8/2015 Gupta ..................... H02M 5/44
(Continued)

FOREIGN PATENT DOCUMENTS

| CN | 1881725 | 12/2006 |
|---|---|---|
| CN | 104638665 | 5/2015 |

(Continued)

OTHER PUBLICATIONS

"International Search Report (Form PCT/ISA/210)", dated Mar. 31, 2017, with English translation thereof, pp. 1-4.

*Primary Examiner* — Yusef A Ahmed
(74) *Attorney, Agent, or Firm* — JCIPRNET

(57) ABSTRACT

Disclosed in the present invention is a hybrid back-to-back direct current transmission system. The system includes an LCC converter and a VSC converter in a back-to-back connection, and a first changeover switch, a second changeover switch, a third changeover switch and a fourth changeover switch. The first changeover switch is connected to a first alternating current system and the LCC converter; the second changeover switch is connected to the first alternating current system and the VSC converter; the third changeover switch is connected to a second alternating current system and the VSC converter; and the fourth changeover switch is connected to the second alternating current system (Continued)

and the LCC converter. In forward power delivery, the first changeover switch and the third changeover switch are closed; and in reverse power delivery, the second changeover switch and the fourth changeover switch are closed. Thereby, it is ensured that the VSC converter always performs inversion operation in any power direction, so as to avoid the problem of potential commutation failure for the LCC converter when being in inversion operation. Also provided is a fast power flow reversal control method of the hybrid back-to-back direct current transmission system.

4 Claims, 5 Drawing Sheets

(51) Int. Cl.
    *H02J 3/06* (2006.01)
    *H02J 3/36* (2006.01)
    *H02M 5/458* (2006.01)

(56) References Cited

U.S. PATENT DOCUMENTS

| | | | | |
|---|---|---|---|---|
| 9,584,007 | B2* | 2/2017 | Zhang | H02H 3/305 |
| 9,948,104 | B2* | 4/2018 | Hu | H02J 3/36 |
| 2010/0046255 | A1* | 2/2010 | Paajarvi | H02J 3/36 363/35 |
| 2010/0145589 | A1* | 6/2010 | Kobayashi | B60K 6/46 701/93 |
| 2012/0161518 | A1* | 6/2012 | Schroeder | H02J 3/36 307/36 |
| 2012/0250371 | A1* | 10/2012 | Fischer De Toledo | H02J 3/16 363/35 |
| 2013/0063989 | A1* | 3/2013 | Jiang-Hafner | H01H 33/596 363/52 |
| 2015/0145252 | A1 | 5/2015 | Lin et al. | |
| 2015/0255978 | A1* | 9/2015 | Chen | H02H 7/045 361/36 |
| 2016/0254668 | A1* | 9/2016 | Huang | H02J 3/34 307/64 |
| 2017/0098936 | A1* | 4/2017 | Tian | H02J 3/14 |
| 2018/0175622 | A1* | 6/2018 | Brorsson | H02J 3/36 |

FOREIGN PATENT DOCUMENTS

| | | |
|---|---|---|
| CN | 104795834 | 7/2015 |
| CN | 104852401 | 8/2015 |
| CN | 105514957 | 4/2016 |
| CN | 205377273 | 7/2016 |

* cited by examiner

HYBRID BACK-TO-BACK DIRECT CURRENT TRANSMISSION SYSTEM AND POWER FLOW REVERSAL CONTROL METHOD

CROSS-REFERENCE TO RELATED APPLICATION

This application is a 371 application of the international PCT application serial no. PCT/CN2017/071655, filed on Jan. 19, 2017, which claims the priority benefit of China application no. 201610061214.9, filed on Jan. 28, 2016. The entirety of each of the abovementioned patent applications is hereby incorporated by reference herein and made a part of this specification.

FIELD OF THE INVENTION

The present invention relates to the field of power electronics and, more particularly to a hybrid direct current transmission system and a power flow reversal control method.

DESCRIPTION OF RELATED ART

High voltage direct current transmission (HVDC) technology can be classified into two categories: line commutated converter based HVDC (LCC-HVDC) technology based on thyristors and voltage source converter based HVDC (VSC-HVDC) technology based on fully-controlled power electronic devices. LCC-HVDC is a mature technology with low cost and low loss. At present, the majority of operating direct current transmission systems in the world are the LCC-HVDC system. However, there are several disadvantages in the LCC-HVDC system, such as commutation failure at an inverter side, strong dependence on an alternating current system, absorption of large amounts of reactive power, large floor area of a converter station, and the like. VSC-HVDC as a new generation of HVDC technology can achieve several advantages, such as the decoupling control of active power and reactive power, no need for reactive power compensation, compact structure, small footprint, absence of commutation failure, and the like; however, currently, there are also disadvantages, such as higher cost, greater loss and the like. LCC-HVDC and VSC-HVDC technologies are thus combined with one another, with one end utilizing an LCC converter and one end utilizing a VSC converter, to form a hybrid direct current transmission technology. The hybrid direct current transmission technology can integrate the advantages of LCC-HVDC and VSC-HVDC technologies, such as maturity, low cost and low loss for LCC-HVDC as well as good regulation performance, small footprint and absence of commutation failure for VSC-HVDC, and would have a broad prospect of engineering application.

In the application of the hybrid back-to-back direct current transmission, bidirectional delivery of power flow needs to be taken into consideration. For the absence of commutation failure at the inverter side of the hybrid direct current transmission in the case of both forward delivery and reverse delivery of power flow, it is necessary to optimize the structure of a hybrid direct current transmission system and to design a corresponding power flow reversal control method.

SUMMARY OF THE INVENTION

The objective of the present invention is to provide a hybrid back-to-back direct current transmission system and a fast power flow reversal control method thereof. The system enables, by provision of changeover switches, a VSC converter to always perform inversion operation in the case of forward delivery or reverse delivery of power flow, so as to avoid the problem of potential commutation failure for an LCC converter when being in inversion operation. Also provided is a control method that realizes fast power flow reversal through changeover switches.

To achieve the above objective, the present invention adopts the following technical solutions:

A hybrid back-to-back direct current transmission system comprises an LCC converter and a VSC converter in a back-to-back connection, and further comprises first to fourth changeover switches, and busbars of first and second alternating current systems, wherein the busbar of the first alternating current system is connected to one end of the first changeover switch and one end of the second changeover switch, respectively, the other end of the first changeover switch is connected to the LCC converter and one end of the fourth changeover switch, respectively, the other end of the second changeover switch is connected to the VSC converter and one end of the third changeover switch, respectively, and the busbar of the second alternating current system is connected to the other end of the third changeover switch and the other end of the fourth changeover switch, respectively;

in forward power delivery, the first changeover switch and the third changeover switch are closed, and the second changeover switch and the fourth changeover switch are opened; and in reverse power delivery, the first changeover switch and the third changeover switch are opened, and the second changeover switch and the fourth changeover switch are closed.

As a further preferred embodiment of the present invention, the first to fourth changeover switches each are an isolation switch or circuit breaker, or a combination of an isolation switch and a circuit breaker.

As a further preferred embodiment of the present invention, at least one ground point is present at a direct current side of the LCC converter and the VSC converter in a back-to-back connection, or at least one ground point is present at a valve side of the VSC converter.

As a further preferred embodiment of the present invention, the presence of the at least one ground point at the valve side of the VSC converter means that a converter transformer valve-side alternating current field of the VSC converter are grounded by means of star reactance plus neutral ground resistance, or that converter transformer valve-side windings of the VSC converter are grounded by means of neutral ground resistance.

The present invention also provides a power flow reversal control method of the above-described hybrid back-to-back direct current transmission system, the power flow reversal control method comprising the following steps:

(1) upon receiving a power flow reversal instruction, proceeding to Step (2), or otherwise remaining at Step (1);

(2) issuing a shutdown command to cause the LCC converter and the VSC converter of the hybrid back-to-back direct current transmission system to be blocked, proceeding to Step (3);

(3) upon changing from forward power delivery to reverse power delivery, proceeding to Step (4), or upon changing from reverse power delivery to forward power delivery, proceeding to Step (5);

(4) opening the first changeover switch Q1, the second changeover switch Q2, the third changeover switch Q3 and the fourth changeover switch Q4, and after waiting for a given reversal delay, closing the second changeover switch Q2 and the fourth changeover switch Q4, proceeding to Step (6);

(5) opening the first changeover switch Q1, the second changeover switch Q2, the third changeover switch Q3 and the fourth changeover switch Q4, and after waiting for a given reversal delay, closing the first changeover switch Q1 and the third changeover switch Q3, proceeding to Step (6); and (6) operating the hybrid back-to-back direct current transmission system again.

In the above-mentioned power flow reversal control method, a particular delay time of the given reversal delay is determined based on system analysis.

By adopting the above-described solutions, advantageous effects of the present invention are that:

(1) the use of changeover switches can ensure that the VSC converter, either in forward power delivery or in reverse power delivery, always performs inversion operation, so as to avoid the problem of potential commutation failure for the LCC converter when being in inversion operation; and (2) the fast power flow reversal process is made simple and yet reliable.

in which: LCC represents an LCC converter; VSC represents a VSC converter; Q1 to Q4 represent first to fourth changeover switches, respectively; and B1 and B2 represents busbars of first and second alternating current systems, respectively.

DETAILED DESCRIPTION OF THE INVENTION

The technical solutions of the present invention are illustrated below in detail with reference to the accompanying drawings and particular embodiments.

Figure 1:
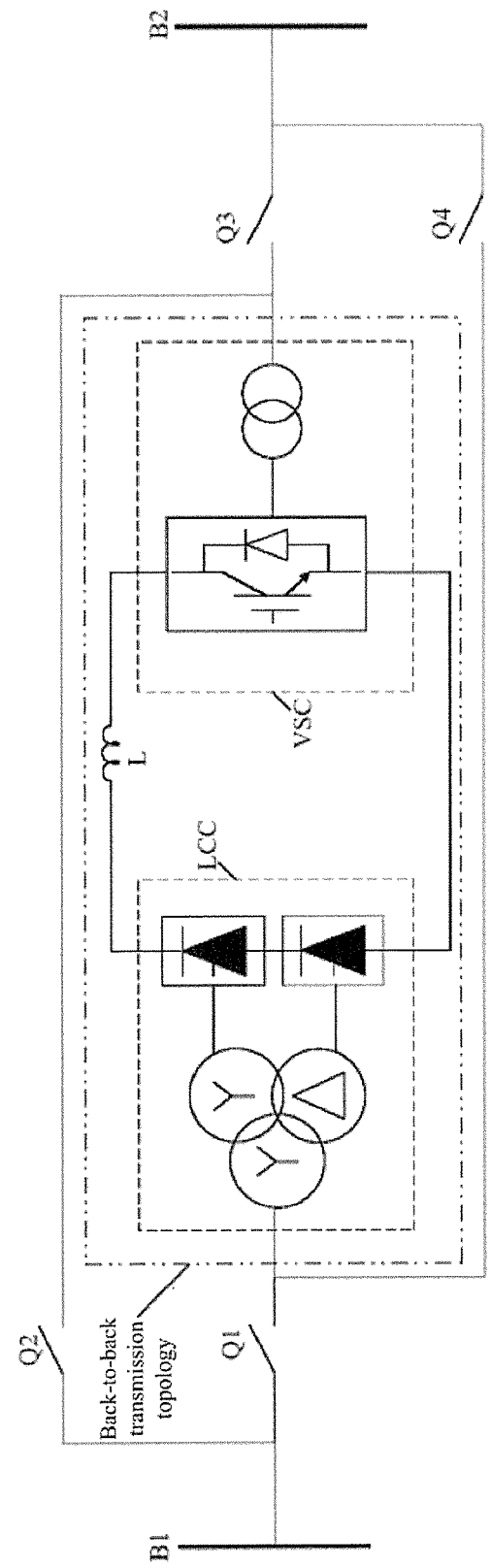
FIG. 1 is a schematic diagram of a hybrid back-to-back direct current transmission system according to the present invention.

FIG. 1 is a schematic diagram of a hybrid back-to-back direct current transmission system according to the present invention. The hybrid back-to-back direct current transmission system comprises a back-to-back transmission topology composed of an LCC converter and a VSC converter in a back-to-back connection via a smoothing reactor L, and a first changeover switch Q1, a second changeover switch Q2, a third changeover switch Q3 and a fourth changeover switch Q4. The first changeover switch Q1 is connected to a busbar B1 of a first alternating current system at one end and connected to an alternating current side of the LCC converter at the other end; the second changeover switch Q2 is connected to the busbar B1 of the first alternating current system at one end and connected to an alternating current side of the VSC converter at the other end; the third changeover switch Q3 is connected to a busbar B2 of a second alternating current system at one end and connected to the alternating current side of the VSC converter at the other end; and the fourth changeover switch Q4 is connected to the busbar B2 of the second alternating current system at one end and connected to the alternating current side of the LCC converter at the other end.

It is defined that, in the hybrid back-to-back direct current transmission system described above, the flow of active power from the first alternating current system to the second alternating current system is referred to as forward power delivery, and the flow of active power from the second alternating current system to the first alternating current system is referred to as reverse power delivery. In forward power delivery, the first changeover switch Q1 and the third changeover switch Q3 are closed, and the second changeover switch Q2 and the fourth changeover switch Q4 are opened. In reverse power delivery, the first changeover switch Q1 and the third changeover switch Q3 are opened, and the second changeover switch Q2 and the fourth changeover switch Q4 are closed. As such, the VSC converter, either in forward power delivery or in reverse power delivery, always performs inversion operation as a receiving end, so as to avoid the problem of potential commutation failure for the LCC converter when being in inversion operation.

In the hybrid back-to-back direct current transmission system described above, the first changeover switch Q1, the second changeover switch Q2, the third changeover switch Q3 and the fourth changeover switch Q4 each are an isolation switch or circuit breaker, or a combination of an isolation switch and a circuit breaker. In the hybrid back-to-back direct current transmission system described above, the connections may be made directly by means of wires or may also be indirectly by means of other switches, where the indirect connections are equivalent to direct connections via wires as the other switches are closed.

The above-described back-to-back transmission topology composed of an LCC converter and a VSC converter in a back-to-back connection via a smoothing reactor L may be in one of several forms as shown in FIG. 2 to FIG. 7.

Figure 2:
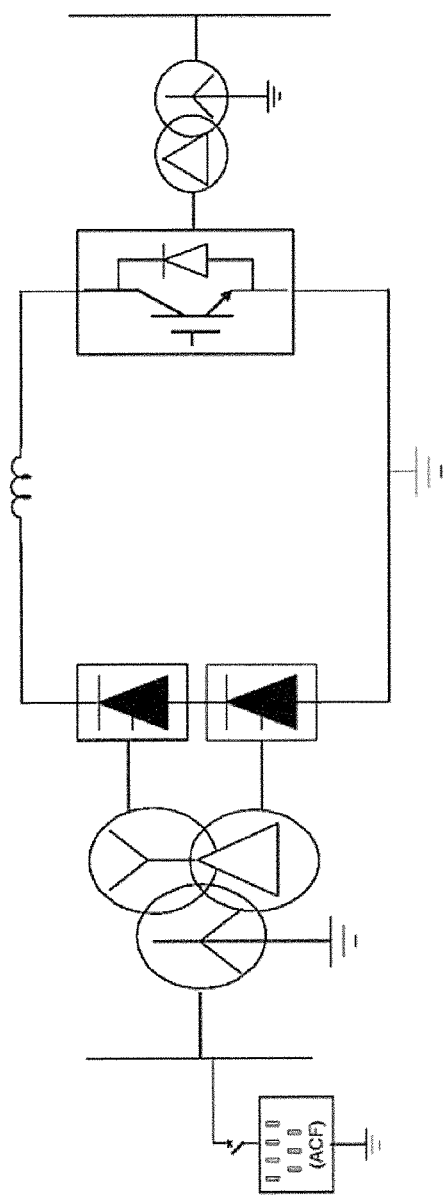
FIG. 2 is a schematic diagram of a hybrid back-to-back direct current transmission topology having a direct current side grounded, according to the present invention.

FIG. 2 is a schematic diagram of a hybrid back-to-back direct current transmission topology having a direct current side grounded according to the present invention. An LCC converter uses a twelve-pulse bridge circuit, where each bridge arm is composed of several thyristors connected in series. The LCC converter is connected to a sending-end alternating current grid via a transformer with three windings connected in respective Y0/Y/Δ configurations. The transformer enables voltage level transformation on a three-phase alternating current of the sending-end alternating current system, to adapt to a required direct current voltage level. Different connections of the transformer secondary side provide a three-phase alternating current with a phase angle difference of 30° for both the upper six-pulse converter bridge and the lower six-pulse converter bridge of the twelve-pulse bridge thyristor converter, so as to reduce harmonic current flowing into the grid. An VSC converter is connected to a receiving-end alternating current grid via a transformer with two windings connected in respective Y0/Δ configurations. The LCC converter and the VSC converter are back-to-back connected via a smoothing reactor L, with a positive wire or negative wire of the direct current side connected to the ground point.

Figure 3:
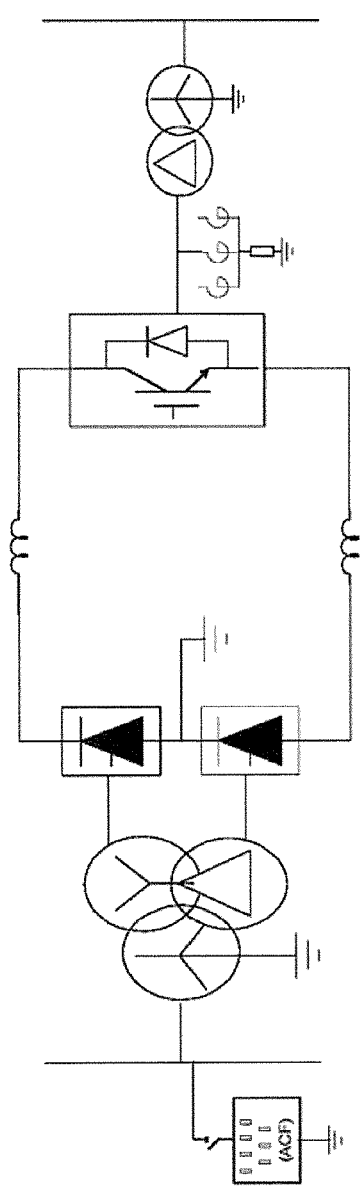
FIG. 3 is a schematic diagram of a hybrid back-to-back direct current transmission topology having an LCC converter with neutral grounding and a VSC converter with impedance grounding, according to the present invention.

FIG. 3 is a schematic diagram of a hybrid back-to-back direct current transmission topology having an LCC converter with neutral grounding and a VSC converter with impedance grounding, according to the present invention. The LCC converter uses a twelve-pulse bridge circuit, where each bridge arm is composed of several thyristors connected in series. A midpoint between both the upper six-pulse converter bridge and the lower six-pulse converter bridge of the twelve-pulse bridge converter is connected to a ground point. The LCC converter is connected to a sending-end alternating current grid via a transformer with three windings connected in respective Y0/Y/Δ configurations. The transformer enables voltage level transformation on a three-phase alternating current of the sending-end alternating current system, to adapt to a required direct current voltage level. Different connections of the transformer secondary side provide a three-phase alternating current with a phase angle difference of 30° for both the upper six-pulse converter bridge and the lower six-pulse converter bridge of the twelve-pulse bridge thyristor converter, so as to reduce harmonic current flowing into the grid. The VSC converter is connected to a receiving-end alternating current grid via a transformer with two windings connected in respective Y0/Δ configurations. The VSC converter valve side is grounded by means of star reactance plus neutral ground resistance. The LCC converter and the VSC converter are back-to-back connected via a smoothing reactor L.

Figure 4:
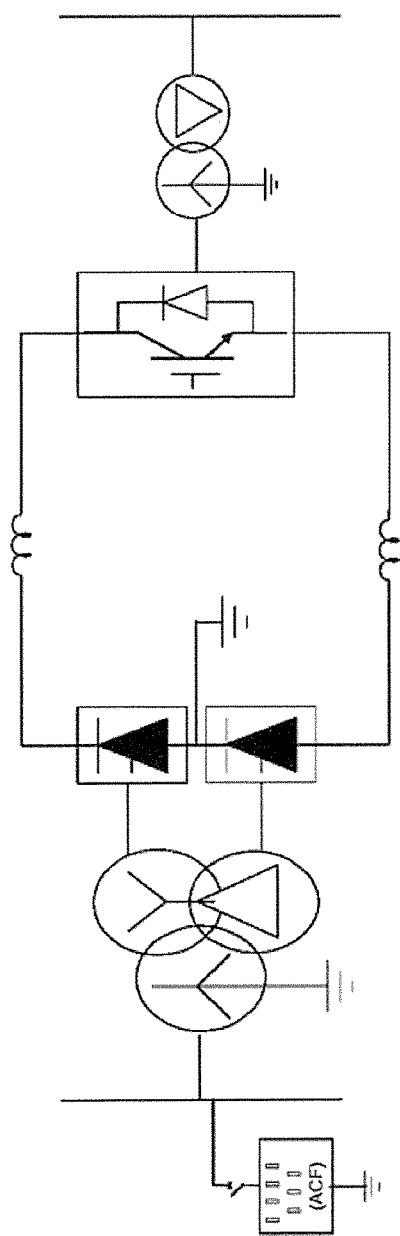
FIG. 4 is a schematic diagram of a hybrid back-to-back direct current transmission topology having an LCC converter with neutral grounding and a VSC converter with converter transformer neutral grounding, according to the present invention.

FIG. 4 is a schematic diagram of a hybrid back-to-back direct current transmission topology having an LCC converter with neutral grounding and a VSC converter with converter transformer neutral grounding, according to the present invention. The LCC converter uses a twelve-pulse bridge circuit, where each bridge arm is composed of several thyristors connected in series. A midpoint between both the upper six-pulse converter bridge and the lower six-pulse converter bridge of the twelve-pulse bridge converter is connected to a ground point. The LCC converter is connected to a sending-end alternating current grid via a transformer with three windings connected in respective Y0/Y/Δ configurations. The transformer enables voltage level transformation on a three-phase alternating current of the sending-end alternating current system, to adapt to a required direct current voltage level. Different connections of the transformer secondary side provide a three-phase alternating current with a phase angle difference of 30° for both the upper six-pulse converter bridge and the lower six-pulse converter bridge of the twelve-pulse bridge thyristor converter, so as to reduce harmonic current flowing into the grid. The VSC converter is connected to a receiving-end alternating current grid via a transformer with two windings connected in respective Δ/Y0 configurations. A neutral point of the transformer valve side uses resistance grounding or direct grounding. The LCC converter and the VSC converter are back-to-back connected via a smoothing reactor L.

Figure 5:
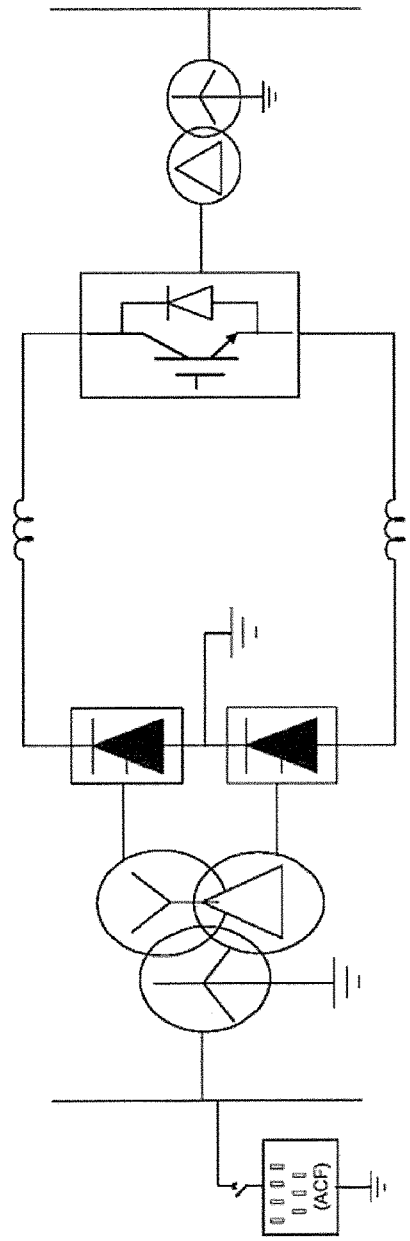
FIG. 5 is a schematic diagram of a hybrid back-to-back direct current transmission topology having an LCC converter with neutral grounding and a VSC converter not grounded, according to the present invention.

FIG. 5 is a schematic diagram of a hybrid back-to-back direct current transmission topology having an LCC converter with neutral grounding and a VSC converter not grounded, according to the present invention. The LCC converter uses a twelve-pulse bridge circuit, where each bridge arm is composed of several thyristors connected in series. A midpoint between both the upper six-pulse converter bridge and the lower six-pulse converter bridge of the twelve-pulse bridge converter is connected to a ground point. The LCC converter is connected to a sending-end alternating current grid via a transformer with three windings connected in respective Y0/Y/Δ configurations. The transformer enables voltage level transformation on a three-phase alternating current of the sending-end alternating current system, to adapt to a required direct current voltage level. Different connections of the transformer secondary side provide a three-phase alternating current with a phase angle difference of 30° for both the upper six-pulse converter bridge and the lower six-pulse converter bridge of the twelve-pulse bridge thyristor converter, so as to reduce harmonic current flowing into the grid. The VSC converter is connected to a receiving-end alternating current grid via a transformer with two windings connected in respective Δ/Y0 configurations. The VSC converter side is not grounded. The LCC converter and the VSC converter are back-to-back connected via a smoothing reactor L.

Figure 6:
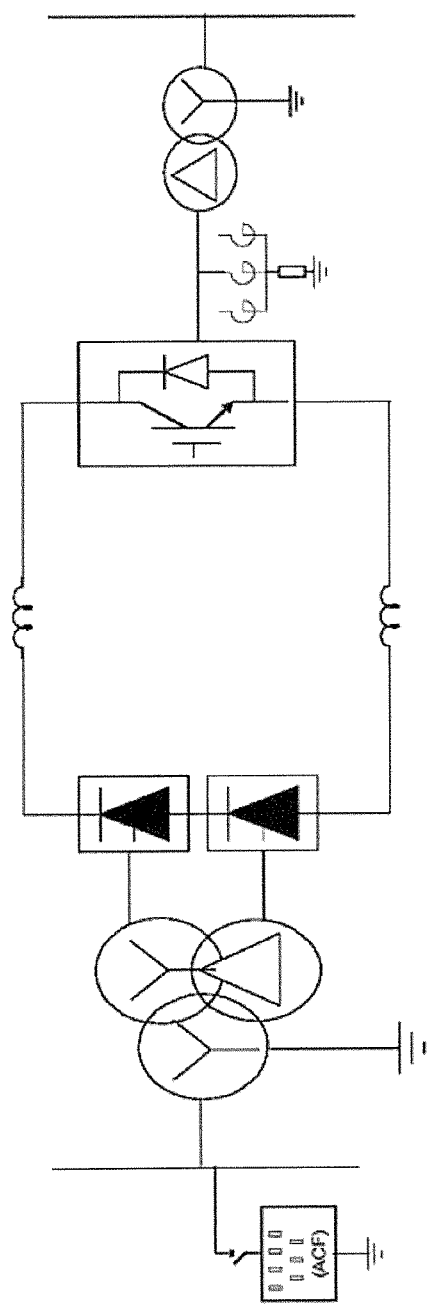
FIG. 6 is a schematic diagram of a hybrid back-to-back direct current transmission topology having an LCC converter not grounded and a VSC converter with impedance grounding, according to the present invention.

FIG. 6 is a schematic diagram of a hybrid back-to-back direct current transmission topology having an LCC converter not grounded and a VSC converter with impedance grounding, according to the present invention. The LCC converter uses a twelve-pulse bridge circuit, where each bridge arm is composed of several thyristors connected in series. The LCC converter is connected to a sending-end alternating current grid via a transformer with three windings connected in respective Y0/Y/Δ configurations. The transformer enables voltage level transformation on a three-phase alternating current of the sending-end alternating current system, to adapt to a required direct current voltage level. Different connections of the transformer secondary side provide a three-phase alternating current with a phase angle difference of 30° for both the upper six-pulse converter bridge and the lower six-pulse converter bridge of the twelve-pulse bridge thyristor converter, so as to reduce harmonic current flowing into the grid. The LCC converter side is not grounded. The VSC converter is connected to a receiving-end alternating current grid via a transformer with two windings connected in respective Y0/Δ configurations. The VSC converter valve side is grounded by means of star reactance plus neutral ground resistance. The LCC converter and the VSC converter are back-to-back connected via a smoothing reactor L.

Figure 7:
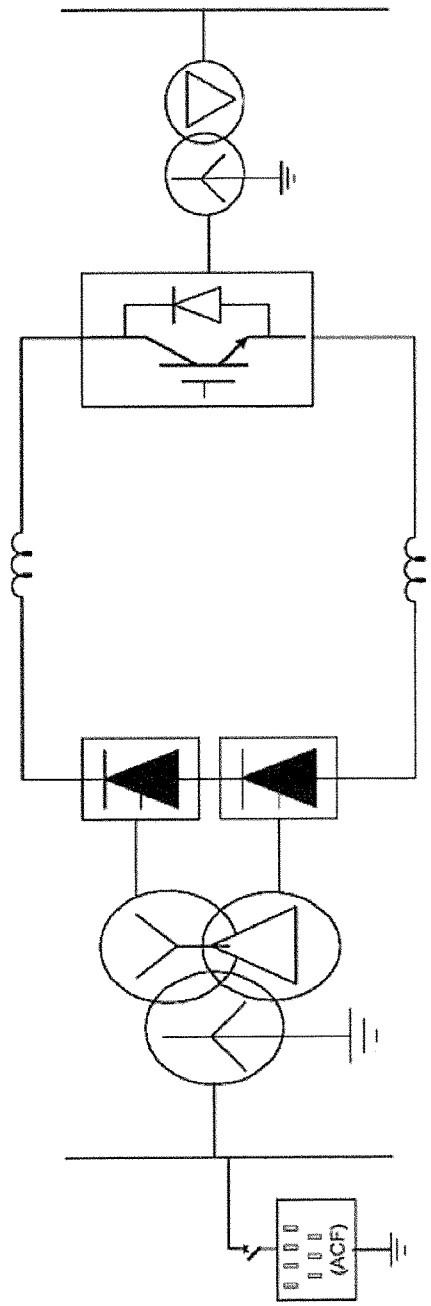
FIG. 7 is a schematic diagram of a hybrid back-to-back direct current transmission topology having an LCC converter not grounded and a VSC converter with converter transformer neutral grounding, according to the present invention.

FIG. 7 is a schematic diagram of a hybrid back-to-back direct current transmission topology having an LCC converter not grounded and a VSC converter with converter transformer neutral grounding, according to the present invention. The LCC converter uses a twelve-pulse bridge circuit, where each bridge arm is composed of several thyristors connected in series. The LCC converter is connected to a sending-end alternating current grid via a transformer with three windings connected in respective Y0/Y/Δ configurations. The transformer enables voltage level transformation on a three-phase alternating current of the sending-end alternating current system, to adapt to a required direct current voltage level. Different connections of the transformer secondary side provide a three-phase alternating current with a phase angle difference of 30° for both the upper six-pulse converter bridge and the lower six-pulse converter bridge of the twelve-pulse bridge thyristor converter, so as to reduce harmonic current flowing into the grid. The LCC converter side is not grounded. The VSC converter is connected to a receiving-end alternating current grid via a transformer with two windings connected in respective Y0/Δ configurations. A neutral point of the transformer valve side uses resistance grounding or direct grounding. The LCC converter and the VSC converter are back-to-back connected via a smoothing reactor L.

Figure 8:
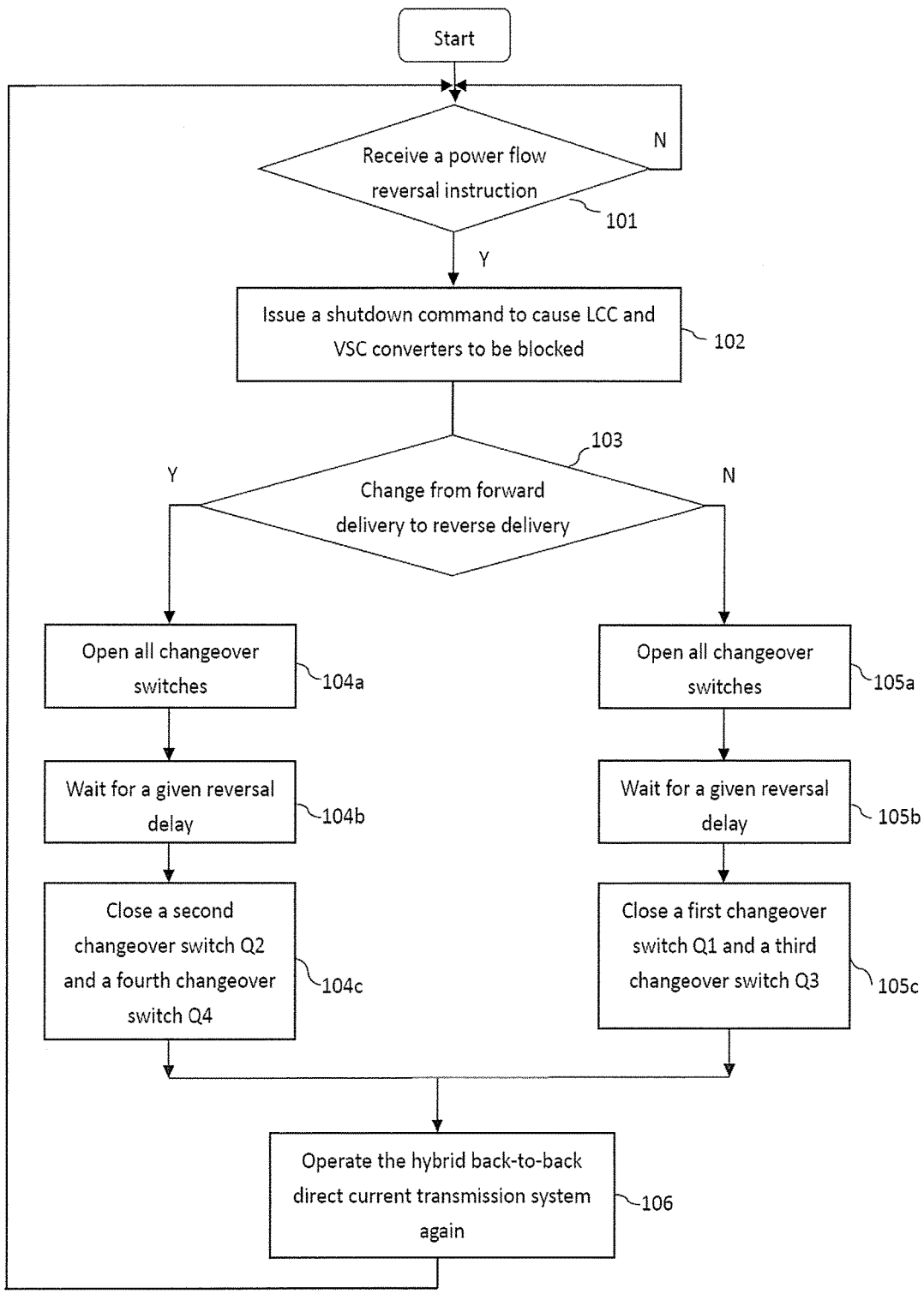
FIG. 8 is a flow diagram of a power flow reversal method of a hybrid back-to-back direct current transmission system according to the present invention.

As shown in FIG. 8, a power flow reversal method of a hybrid back-to-back direct current transmission system according to the present invention comprises:

Step 101: upon receiving a power flow reversal instruction, proceeding to Step 102, or otherwise remaining at Step 101;

Step 102: issuing a shutdown command to cause an LCC converter and a VSC converter of the hybrid back-to-back direct current transmission system to be blocked;

Step 103: upon changing from forward power delivery to reverse power delivery, performing Step 104a, Step 104b, and Step 104c in succession; or upon changing from reverse power delivery to forward power delivery, performing Step 105a, Step 105b, and Step 105c in succession;

Step 104a: opening all the changeover switches, that is, a first changeover switch Q1, a second changeover switch Q2, a third changeover switch Q3 and a fourth changeover switch Q4 are opened;

Step 104b: waiting for a given reversal delay;

Step 104c: closing a second changeover switch Q2 and a fourth changeover switch Q4, proceeding to Step 106;

Step 105a: opening all the changeover switches, that is, a first changeover switch Q1, a second changeover switch Q2, a third changeover switch Q3 and a fourth changeover switch Q4 are opened;

Step 105b: waiting for a given reversal delay;

Step 105c: closing a first changeover switch Q1 and a third changeover switch Q3, proceeding to Step 106; and Step 106: operating the hybrid back-to-back direct current transmission system again.

In the Step 104b and the Step 105b as described above, a particular delay time of the reversal delay may be determined based on system analysis, and is preferably in a range from 1 s to 60 min, by taking into consideration the discharge time of a converter damping circuit, the discharge time of a capacitor before an alternating current filter is put into use again, for example.

The above embodiments are only for the purpose of illustrating the technical concept of the present invention, and are not intended to limit the scope of the present invention. Any modification to the technical solutions based on the technical concept of the present invention, will fall within the scope of the present invention.

What is claimed is:

1. A hybrid back-to-back direct current transmission system, comprising: a line-commutated converter (LCC) and a voltage-sourced converter (VSC) in a back-to-back connection, and further comprising first to fourth changeover switches, and busbars of first and second alternating current systems, wherein the busbar of the first alternating current system is connected to one end of the first changeover switch and one end of the second changeover switch, respectively, the other end of the first changeover switch is connected to the LCC converter and one end of the fourth changeover switch, respectively, the other end of the second changeover switch is connected to the VSC converter and one end of the third changeover switch, respectively, and the busbar of the second alternating current system is connected to the other end of the third changeover switch and the other end of the fourth changeover switch, respectively;

in forward power delivery, the first changeover switch and the third changeover switch are closed, and the second changeover switch and the fourth changeover switch are opened; and in reverse power delivery, the first changeover switch and the third changeover switch are opened, and the second changeover switch and the fourth changeover switch are closed.

2. The hybrid back-to-back direct current transmission system of claim 1, wherein the first to fourth changeover switches each is an isolation switch or a circuit breaker, or a combination of the isolation switch and the circuit breaker.

3. The hybrid back-to-back direct current transmission system of claim 1, wherein at least one ground point is present at a direct current side of the LCC converter and the VSC converter in the back-to-back connection, or at least one ground point is present at a valve side of the VSC converter.

4. The hybrid back-to-back direct current transmission system of claim 3, wherein the presence of the at least one ground point at the valve side of the VSC converter means that a converter transformer valve-side alternating current field of the VSC converter is grounded by means of star reactance plus neutral ground resistance, or that converter transformer valve-side windings of the VSC converter are grounded by means of neutral ground resistance.

* * * * *